Aug. 30, 1927.
A. K. McMILLEN
1,640,957
ROLL-OFF PLATE
Filed Oct. 21, 1926
3 Sheets-Sheet 1
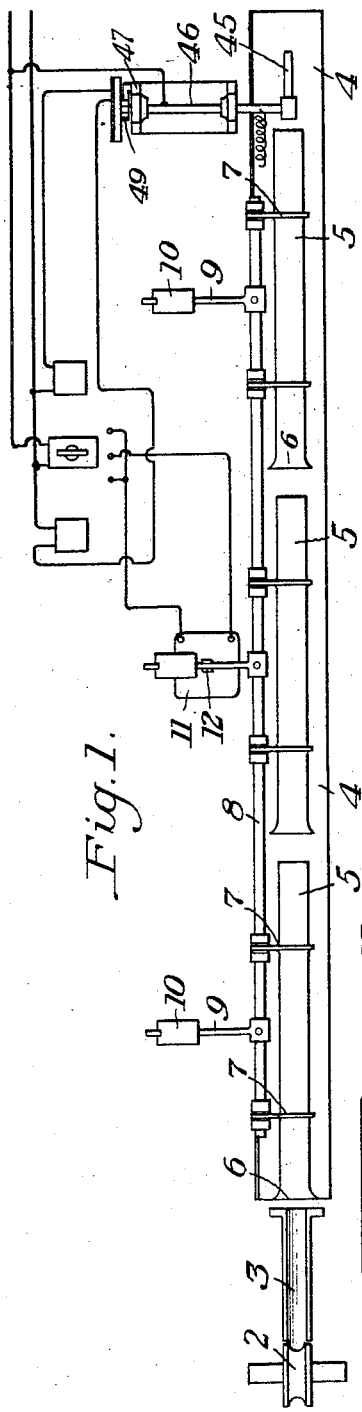
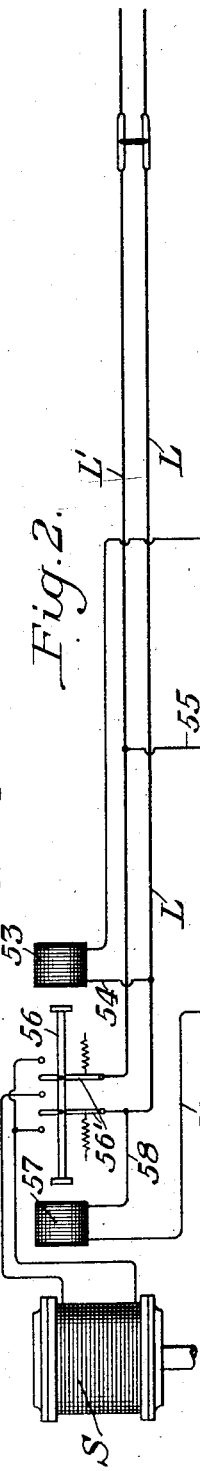
INVENTOR
Albert K. McMillen

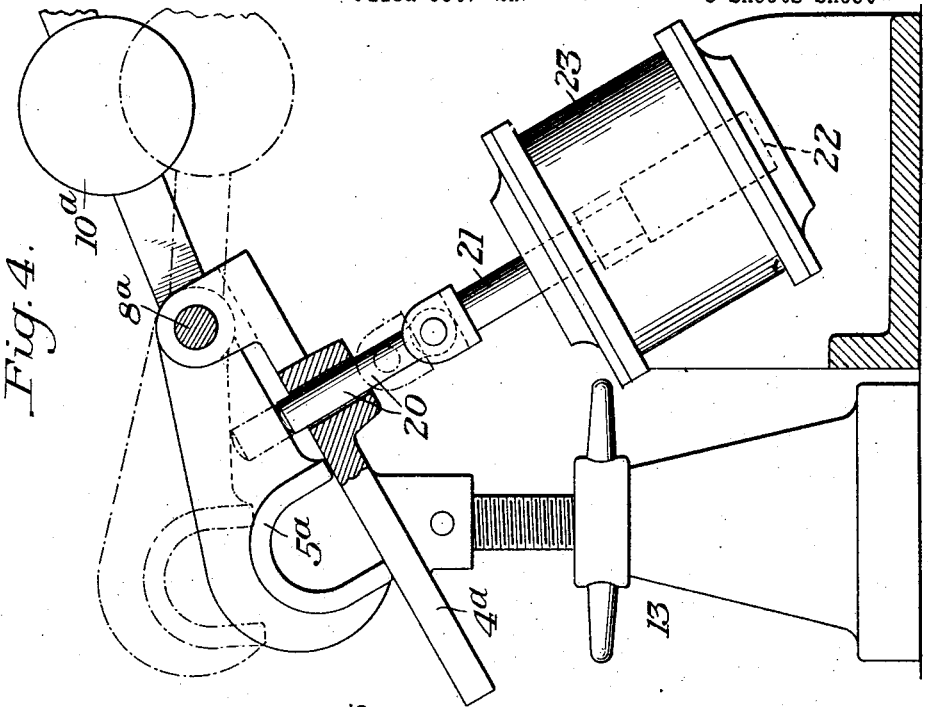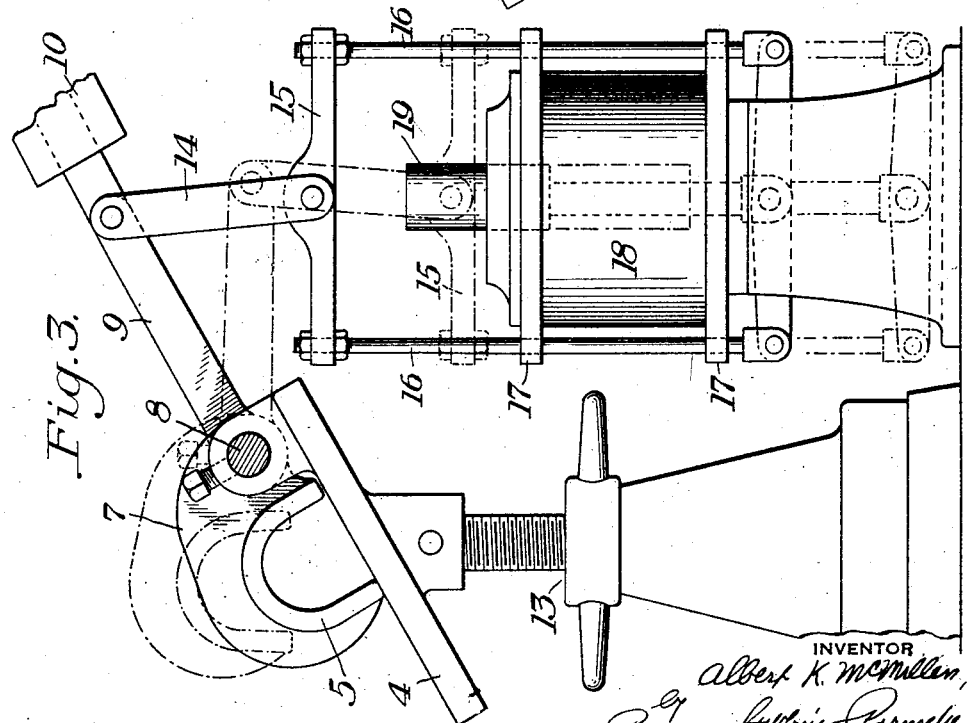

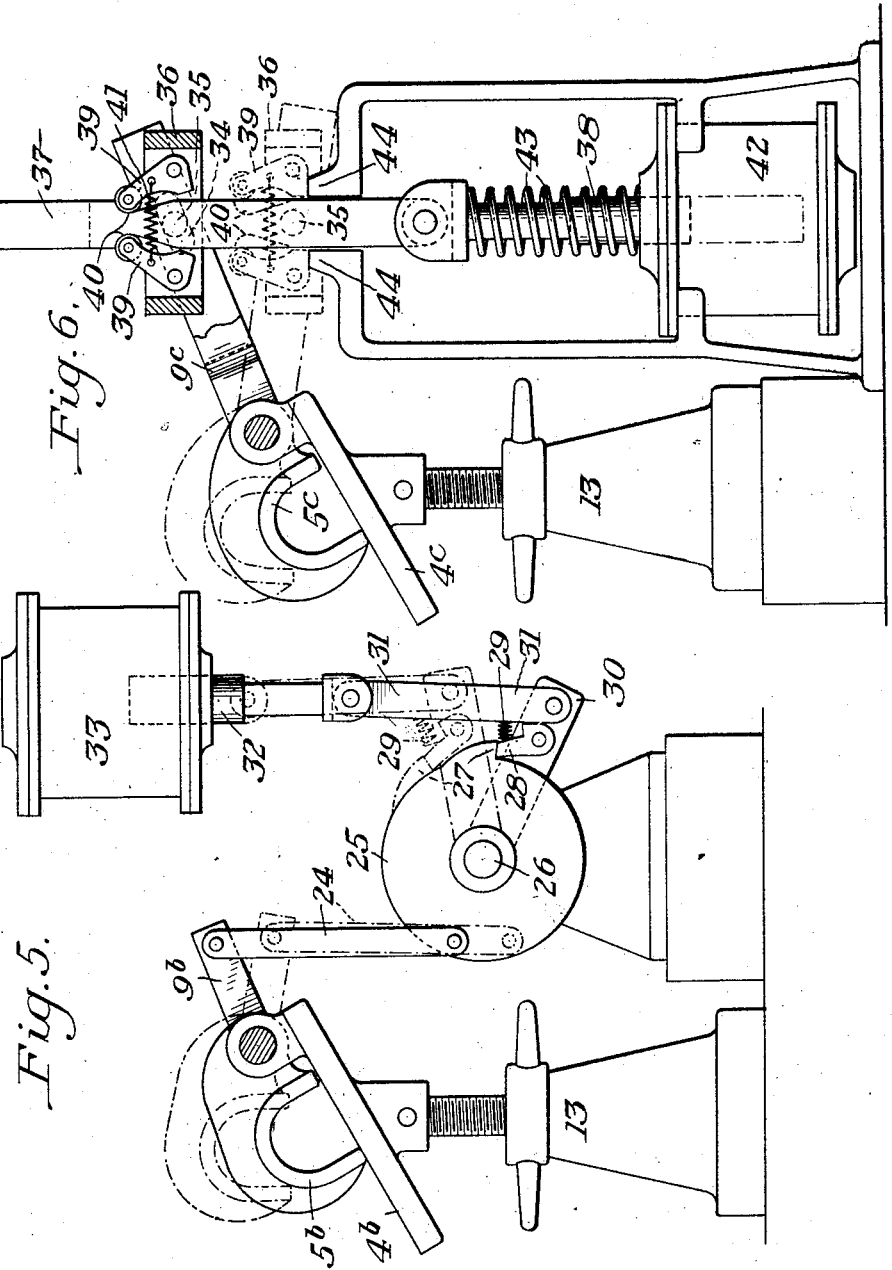

Patented Aug. 30, 1927.

1,640,957

UNITED STATES PATENT OFFICE.

ALBERT K. McMILLEN, OF PITTSBURGH, PENNSYLVANIA, ASSIGNOR TO CENTRAL TUBE COMPANY, OF PITTSBURGH, PENNSYLVANIA, A CORPORATION OF PENNSYLVANIA.

ROLL-OFF PLATE.

Application filed October 21, 1926. Serial No. 143,292.

The present invention relates broadly to the art of tube manufacture, and more particularly to roll-off plates suitable for use in the manufacture of tubes. The term "tubes" is used herein in its generic sense as being definitive of pipes, conduits, tubes and the like, irrespective of the exact manner of manufacture thereof.

It is customary at the present time in the manufacture of tubes by the butt welding process, for example, to pass the tubes after welding and sizing on to a device termed in the art a roll-off plate, which plate is effective for delivering them to a cooling rack, conveyor or other desired apparatus.

In view of the rapidity with which tubes are produced with present day apparatus, and the temperatures at which they are delivered to the roll-off plate, the question of operation of the roll-off plate to permit the discharge of the formed tubes at the required intervals and without unnecessary delay, presents quite a problem. The present invention has for one of its objects the provision of an automatically-operated roll-off plate, the operation of which is controlled by and occurs in timed relation to the delivery of the tubes to the roll-off plate.

Another object of the present invention is to provide improved operating means and improved control means for a roll-off plate of the general character referred to. In the accompanying drawings there are shown for purposes of illustration certain preferred embodiments of the present invention, it being understood that the drawings do not define the limits of my invention as changes in the construction and operation disclosed therein may be made without departing either from the spirit of the invention or the scope of my broader claims.

In the drawings:

Figure 1 is a diagrammatic top plan view illustrating one construction embodying the present invention;

Figure 2 is a wiring diagram illustrating the electrical connections for the operating mechanism of Figure 1;

Figure 3 is a side elevational view, partly in section, illustrating one form of operating mechanism;

Figure 4 is a view similar to Figure 3, illustrating another embodiment of the invention;

Figure 5 is a view similar to Figures 3 and 4 showing still another form of the invention, and Figure 6 is a view similar to Figures 3, 4, and 5 illustrating a further embodiment of the invention.

It will be understood that the present invention is adaptable for use with tube forming apparatus of any desired character, and that such apparatus constitutes no essential part of the present invention. In Figure 1 I have illustrated in top plan view a roll 2, which, as customary in the art, may constitute one of a pair of super-imposed rolls between which formed tubes are delivered to a support 3. The rolls 2 may comprise one means for feeding the tubes, or may be of such nature as to effect either the sizing or straightening of the tubes or both.

The tubes after leaving the support 3 pass on to a laterally inclined plate 4, commonly referred to in the art as a roll-off plate. The tubes are initially delivered substantially to the central portion of the plate with respect to its width, and are maintained in position thereon by guards or covers 5 of substantially inverted U-shape. These guards may each have a bell-shape leading-end 6 for directing the tubes thereinto, and may be of any desired dimensions depending upon the tube sizes with which they cooperate.

There may be any desired number of guards 5 cooperating with a single roll-off plate, three of such guards being indicated diagrammatically in Figure 1. These guards may be carried by brackets 7 cooperating with an operating shaft 8 extending lengthwise of the roll-off plate and suitably mounted adjacent one edge thereof. Cooperating with this operating shaft are suitable counterbalancing means herin illustrated as comprising arms 9 carrying weights 10 adjustable thereon.

With the construction shown, the relative weights of the guards and counterweights will be such that normally the guards will overbalance the counterweights and remain in cooperative relation to the roll-off plate. In this position they are effective for receiving a tube delivered by the roll or rolls 2, and for holding the same until the shaft 8 is rocked to elevate them and permit the discharge thereof. Due to the rapidity with which the tubes are delivered, I have provided means for effecting the operation of the guards automatically. This means is illustrated diagrammatically in Figure 1 as comprising a solenoid 11, the armature of which is operatively connected by a suitable link structure 12 with one of the arms 9, whereby upon energizing the solenoid the guards will be lifted.

The exact construction of the operating means may be varied as required, Figures 3 to 6, both inclusive, being illustrative of different embodiments for this purpose. In Figure 3 the roll-off plate 4 is illustrated as being mounted on an adjustable support 13 whereby the exact elevation of the roll-off plate required for proper reception of the tubes may be obtained. The arm 9 secured to the guard 5 is illustrated as connected by a link 14 to the cross head 15 carried by guides 16 mounted for vertical movement in the heads 17 of a solenoid 18. Normally the parts occupy the position illustrated in solid lines in this figure with the core 19 projecting a substantial distance out of the center of the magnetic field of the solenoid. Upon energizing the solenoid the parts will be moved to the chain line position shown, whereby the guide or guides 5 will be raised to permit the discharge of a tube therefrom. Upon deenergization of the solenoid, the parts will automatically return by gravity to the position indicated in solid lines.

In the form of the invention illustrated in Figure 4, the guide 5ª is provided with counterbalancing means 10ª, the weight of the respective parts being such, however, that normally the guide will occupy the full line position of this figure. Projecting through the roll-off plate 4ª is a push rod 20 pivotally secured to a link 21 of non-magnetic material projecting from the core 22. When the solenoid 23 is energized, the core 22 will move upwardly and effect a corresponding movement of the guide into the dotted line position shown.

In Figure 5 the guide 5ᵇ, is shown as having its arm 9ᵇ connected by a link 24 to a disc 25 having a suitable pivotal mounting 26. For rotating the disc a predetermined distance at will in a counter-clockwise direction as viewed in this figure, it is provided with a tooth 27 adapted to be engaged by a pawl 28 normally held in engagement therewith by a spring 29. The pawl is pivotally secured to an arm 30, moved about the axis of the mounting 26 and operated by a link 31 operatively secured to the core 32 of a solenoid 33. From the foregoing description, the operation of the parts upon supplying current to the solenoid will be apparent.

In Figure 6, the guide 5ᶜ is illustrated as having its arm 9ᶜ formed with a slot 34 adapted to receive a pin 35 projecting laterally from a frame 36 straddling the rod 37, projecting upwardly from the core 38. The frame 36 carries pivotally mounted pawls 39 normally urged one toward the other into engagement with recesses 40 by means of a spring 41. When the solenoid 42 is energized, it will draw its core 38 downwardly against the action of the spring 43 and swing the guide 5ᶜ to its dotted line position. At substantially the completion of the downward movement of the core the lower ends of the pawls 39 will engage the stops 44 whereby they will be swung against the action of the spring 41 out of engagement with the recesses 40. This will release the arm 9ᶜ and permit the guide to return by gravity to its original position ready for the reception of the next length of tube.

For energizing the solenoids in proper timed relation to the delivery of the tube to the roll-off plate, there may be provided a spring biased flag 45 lying in the path of the tubes and adapted to be engaged thereby, even after the tubes have started to move from the roll-off plate. This flag is secured to a shaft 46 which shaft carries a projecting arm 47 on which is pivotally mounted a spring pressed pawl 48 for cooperation with the ratchet teeth 49, on a contact arm 50. The relation of the parts is such that each pipe will move the flag 45 such a distance as to rotate the shaft 46 sufficiently to advance the contact arm 50 the distance between the adjacent contacts with which it cooperates. Each third contact 51, as indicated in Figure 2, is neutral and represents the off position of the parts. As the shaft 46 is rotated in a counter-clockwise direction as viewed in Figure 2, the arm 50 will leave the contact 51 and move into engagement with one of the contacts O. All of these contacts O are connected to a wire 52 leading to one side of a magnet 53, the opposite side of which has a connection 54 with the line wire L leading from a suitable source of current. Connected to the line wire L' is a lead 55 in electrical conducting relationship with the shaft 46, whereby with the arm 50 in engagement with one of the contacts O, the circuit to the magnet 53 will be closed. This will attract the armature 56 which cooperates with a double pole, double-throw switch 56' connected to the line wires L and L' in such manner that the solenoid S, corresponding to the solenoids 11, 18, 23, 33, and 42 heretofore referred to, will be energized with a current flow in one direction. The arm 50 will only remain in engagement with the contact O for a very brief space of time, motion of the arm being continued by the onward travel of the tube sufficiently to bring the arm into engagement with one of the contacts R. In the meantime, however, the energization of the solenoid S will have released the tube. The engagement between the arm 50 and one of the contacts R will result in energizing the magnet 57 which has a connection 58 with the line wire L and a connection 59 with the contacts R and in turn through them and the arm 50 to the line wire L'. This will result in moving the switch 56' in the opposite direction whereby the current flow through the solenoid will be reversed for an instant to insure a return movement of the guides by hastening the collapse of the field of the solenoid and any fields of residual magnetism. The movement of the arm 50 will continue by reason of the contact of the flag 45 by the tube until the arm 50 reaches the following contact 51 in which the parts are in neutral position. Thereafter, the next tube will effect another cycle of operations similar to that described.

Certain advantages of the present invention arise from the provision of a roll-off plate adapted to receive tubes as rapidly as formed and constructed to retain such tubes for a predetermined length of time only.

Still other advantages of the present invention arise from the provision of a roll-off plate provided with guides automatically operated in predetermined time relation to the delivery of tubes thereto.

I claim:

1. In a tube making apparatus, a roll-off plate, guiding means cooperating therewith and movable to inoperative position, electrical means for operating said guiding means, and a control mechanism for said electrical means adapted to be operated by the tubes delivered to said roll-off plate, said control mechanism being movable successively to an energizing position, a reverse position and a neutral position under the influence of each tube.

2. The combination with a roll-off plate, a roll-off plate cover guide and an operating electro-responsive device for the cover guide, of a control mechanism for causing the electro-responsive device to follow a predetermined sequence of operations in response to the position of material on the roll-off plate.

3. The combination with a roll-off plate and a roll-off plate cover guide adapted to receive a body of material for movement thereacross, of an electro-responsive controlling mechanism for the roll-off plate cover guide that is successively operable to perform a succession of operations in accordance with the position of the material on the roll-off plate.

4. The combination with a roll-off plate, a roll-off plate cover guide and a member actuated by material resting upon the roll-off plate, of a control apparatus for the cover guide comprising a contactor having a plurality of stationary contacting members and an arm that is movable to engage a predetermined number of the stationary contacting members in response to the position of the material on the roll-off plate.

In testimony whereof I have hereunto set my hand.

ALBERT K. McMILLEN.